UNITED STATES PATENT OFFICE.

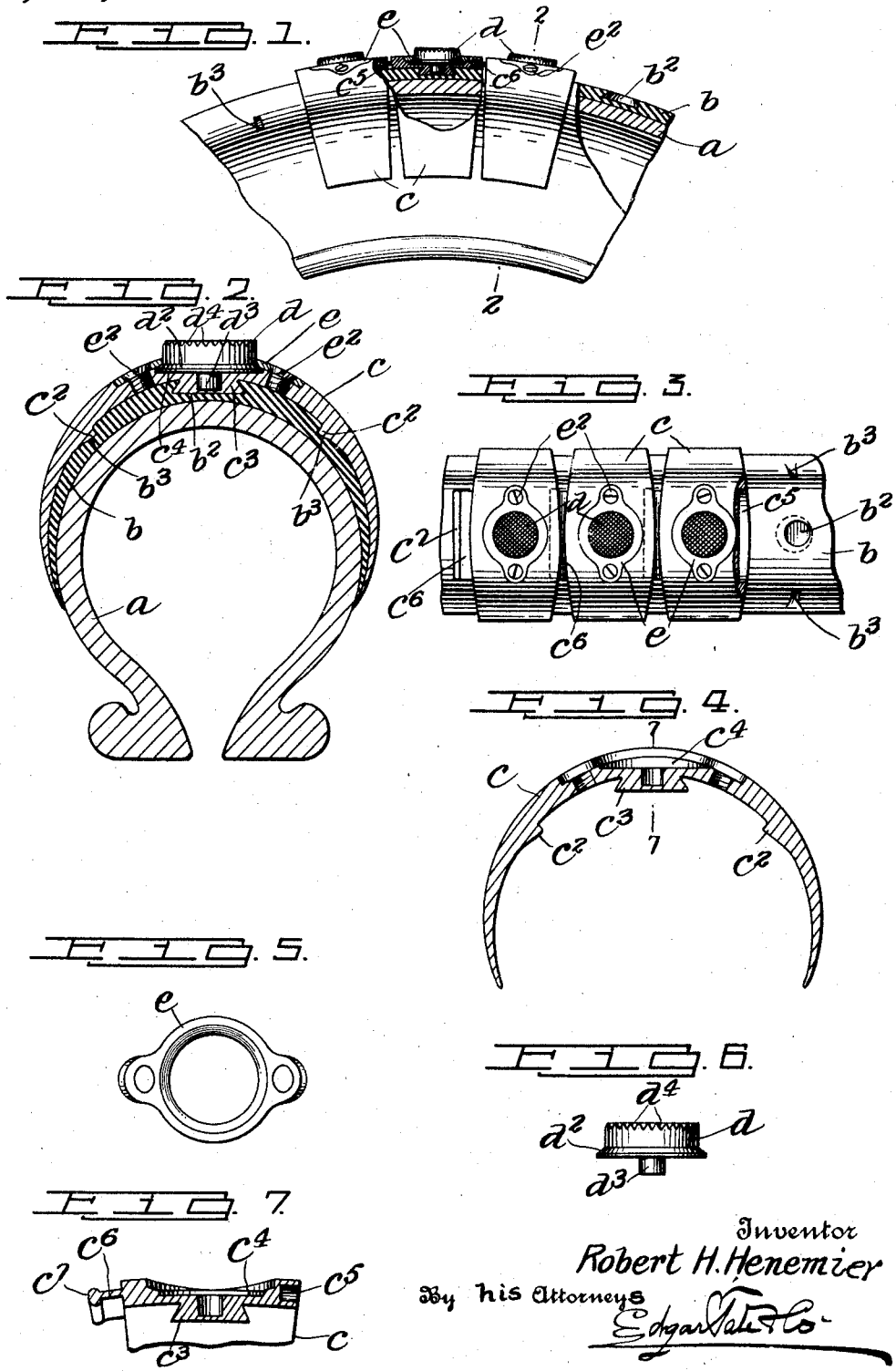

ROBERT H. HENEMIER, OF NEW YORK, N. Y.

PNEUMATIC TIRE.

1,330,587.  Specification of Letters Patent.  Patented Feb. 10, 1920.

Application filed March 27, 1919. Serial No. 285,465.

*To all whom it may concern:*

Be it known that I, ROBERT H. HENEMIER, a citizen of the United States, and residing at New York, in the county of New York and State of New York, have invented certain new and useful Improvements in Pneumatic Tires, of which the following is a specification, such as will enable those skilled in the art to which it appertains to make and use the same.

This invention relates to pneumatic tires, and particularly to tires of this class which employ the usual main annular shoe for the protection of the inner inflatable tube, and the object of the invention is to provide improved protector and anti-skid devices for said shoe which are so constructed as to prevent the puncture of the shoe, and the inflatable tube carried therein, and also prevent skidding, and with this and other objects in view the invention consists in the construction, combination and arrangement of parts hereinafter described and claimed.

The invention is fully disclosed in the following specification, of which the accompanying drawing forms a part, in which the separate parts of my improvement are designated by suitable reference characters in each of the views, and in which:—

Figure 1 is a side view of a part of the shoe of a pneumatic tire and showing my improvement as applied, part of the construction being broken away or shown in section;

Fig. 2 a partial transverse section on the line 2—2 of Fig. 1;

Fig. 3 a plan or face view of the construction shown in Fig. 1;

Fig. 4 a view similar to Fig. 2 but showing only one part of my improvement;

Fig. 5 a detail view of another part of my improvement detached;

Fig. 6 a side view of another part of my improvement detached; and,

Fig. 7 a section on the line 7—7 of Fig. 4.

In the drawing forming part of this specification, I have shown at $a$ the main shoe member of a pneumatic tire, and this main shoe member may be formed or constructed in the usual or any desired manner, and inclosing the main shoe member $a$ and extending entirely around the same is a supplemental shoe member $b$, which is composed of rubber or rubber and canvas, and which may be formed integrally with the main shoe member $a$, or may be formed separately and vulcanized thereto, my invention being not limited to the method of constructing or employing the shoe members $a$ and $b$.

In the practice of my invention, I provide tire protectors $c$ which consist of transverse plates arc-shaped in form and which taper in thickness from the central parts thereof to the ends thereof, as clearly shown in Figs. 2 and 4, and the side edge portions of these transverse protector plates $c$ are tapered inwardly as shown in Figs. 1 and 3 to provide for the proper movement of the shoe, or the tire, when said plates are connected therewith.

The protector plates $c$ are provided centrally of their outer surfaces with undercut circular recesses $b^2$, and at a predetermined distance from and at each side of the central undercut circular recesses $b^2$ with other recesses $b^3$, and the plates $c$ are provided with projecting teeth or members $c^2$ which fit in the recesses $b^3$, and said plates are also provided centrally of their inner surfaces with circular lugs or projections $c^3$, the walls of which are tapered inwardly and which are adapted to be inserted into the recesses $b^2$ of the parts $b$.

The outer or bearing surfaces of the plates $c$ are also provided centrally thereof with circular countersunk recesses $c^4$, and I also provide bearing blocks $d$ which are circular in form and provided with flared or projecting annular base members $d^2$ which fit in the recesses $c^4$ of the plates $c$, and the blocks $d$ are also provided centrally of the bottom thereof with projecting studs $d^3$ which fit in corresponding sockets in the parts $c^3$ of the plates $c$ as clearly shown in Figs. 1 and 2, and said blocks $d$ are held in place by annular plates $e$ which are secured to the protector plates $c$ by screws $e^2$.

The plates $c$ are also provided centrally of one side edge portion with curved and oblong recesses $c^5$ and of the other side edge portion with projecting flange members $c^6$ having curved and oblong head portions $c^7$, and when said plates $c$ are placed in position the projecting members $c^6$—$c^7$ of one plate fit in the corresponding recesses $c^5$ of another plate, as is clearly shown in Figs. 1 and 3.

The annular plates $e$ and blocks $d$ are shown detached in Figs. 5 and 6, and with the construction described the blocks $d$ are rotatably mounted, as will be readily understood. The outer surfaces of the blocks $d$ are serrated or hatched so as to provide them with teeth $d^4$ and, as will be understood, the plates $c$ and blocks $d$ serve to protect the main body of the tire from puncture at all times and to form a complete armor therefor, and said blocks $d$ also serve to prevent skidding, and these blocks also, by reason of the fact that they are rotatably mounted, as herein described, facilitate the turning of the vehicle and prevent torsional twisting of the bearing surface of the tire, and of the tire protect plates $c$. With my improvement the danger of puncture is prevented or reduced to a minimum, and the life or use of a tire correspondingly extended.

It will also be understood from the foregoing description that the protector plates $c$, the blocks $d$ and the annular plates $e$ by which said blocks $d$ are held in position are detachable and new parts of this class may be substituted for old ones whenever desired, or when the said parts become worn and inoperative, and this is also an important feature of my improvement by reason of the fact that in this way the life of the tire may be extended.

The method herein shown and described for securing the plates $c$ in position and the operative connection of said plates, including the parts or constructions $c^5$, $c^6$—$c^7$ facilitate, as will be understood, the said connection of said plates with the shoe member to hold them in their proper position, but my invention is not limited to the method herein shown and described for connecting the protector plates $c$ with the body of the tire or the main shoe member and any suitable means may be employed for this purpose, and while I have shown and described the preferred form of construction for carrying my invention into effect, the said invention is not limited to the details of construction herein shown and described, and changes therein and modifications thereof may be made, within the scope of the appended claims, without departing from the spirit of my invention or sacrificing its advantages.

Having fully described my invention, what I claim as new and desire to secure by Letters Patent, is:—

1. An annular protector for a pneumatic tire comprising a plurality of transversely arranged and loosely connected arc-shaped plates adapted to closely fit the tire and detachably connected with the shoe portion thereof, said plates being provided centrally of their outer surfaces with recesses adapted to receive bearing blocks, bearing blocks detachably and rotatably mounted in said recesses and projecting beyond said plates and provided with flaring bases, and annular devices detachably connected with said plates and inclosing said bearing blocks and their bases for holding said blocks in position.

2. An annular protector for a pneumatic tire having a supplemental shoe portion, comprising a plurality of transversely arranged and loosely connected arc-shaped plates adapted to closely fit the supplemental shoe portion and detachably connected therewith, said plates being provided on their inner surfaces with projecting parts adapted to engage said shoe portion, and said plates being also provided centrally of their outer surfaces with circular recesses, bearing blocks rotatably mounted in said recesses and projecting beyond the surfaces of said plates and provided with flaring bases, and means detachably connected with said plates and overlapping said bases for securing said blocks in position.

3. The herein described protector for pneumatic tires, said protector comprising a plurality of transversely arranged and loosely connected arc-shaped plates adapted to closely fit the tire, projecting lug members on the inner faces of each of said plates, said lug members operating in connection with corresponding recesses in the tread portion of the tire for holding said plates in connection therewith, said plates being each provided centrally of their outer faces with circular recesses adapted to receive independent bearing members, and bearing members detachably and rotatably mounted in each of said recesses and projecting beyond said plates.

4. An annular protector for pneumatic tires comprising a plurality of transversely arranged and loosely connected plates, said plates being provided centrally of their outer faces with circular recesses adapted to receive independent bearing blocks and circular bearing blocks detachably and rotatably mounted in said recesses and provided with flaring bases, and detachable members secured to the outer faces of said plates for holding said blocks in position, the outer faces of said blocks projecting beyond the outer faces of said plates.

In testimony that I claim the foregoing as my invention I have signed my name in presence of the subscribing witnesses this 26th day of March 1919.

ROBERT H. HENEMIER.

Witnesses:
C. E. MULREANY,
H. E. THOMPSON.